Sept. 30, 1958   A. FUMIA   2,853,836
GRINDER FOR TRUING CUTTERS
Filed Dec. 6, 1956   8 Sheets-Sheet 1

INVENTOR.
ARTHUR FUMIA
BY
*Richard W. Treverton*
ATTORNEY

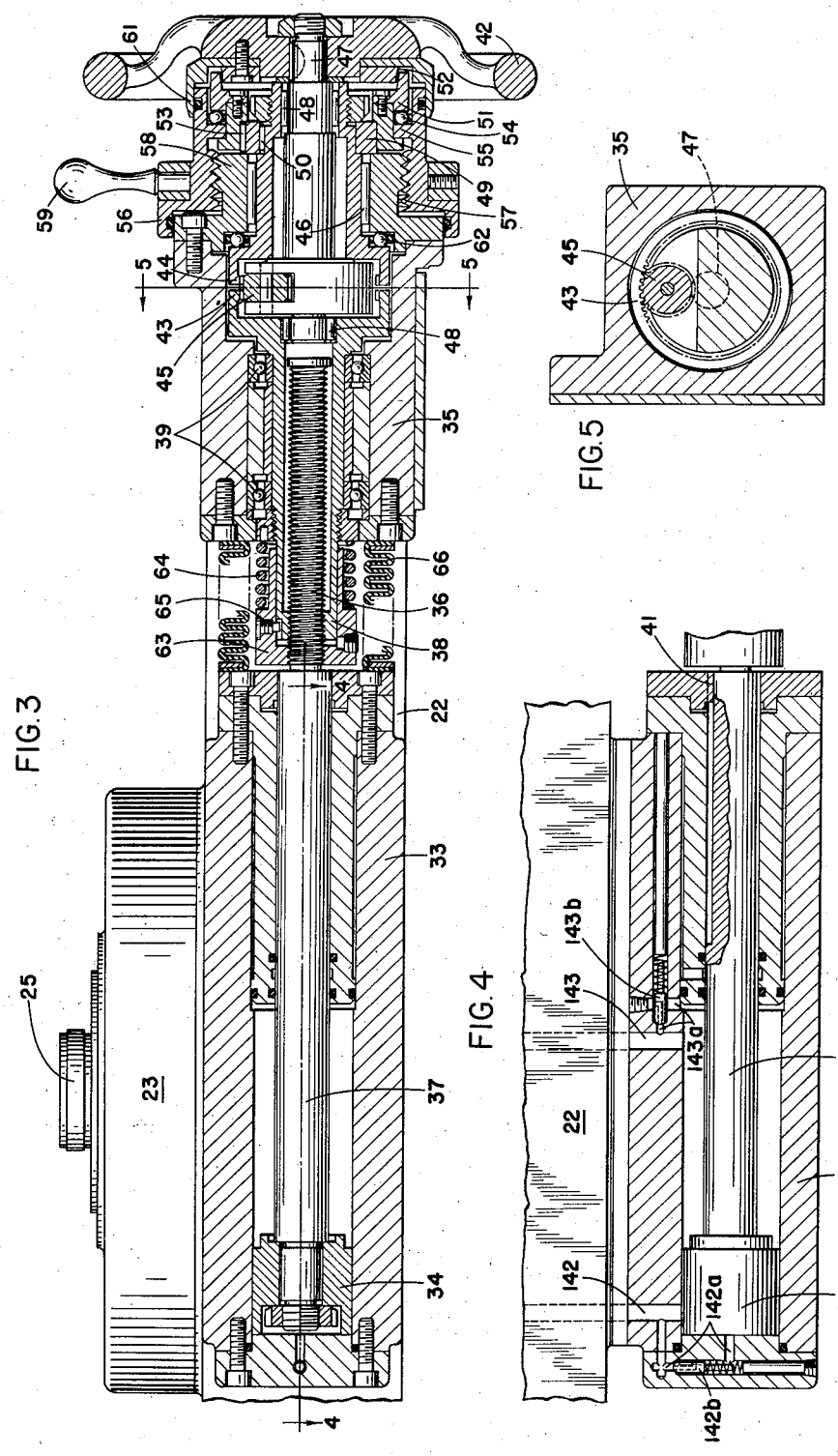

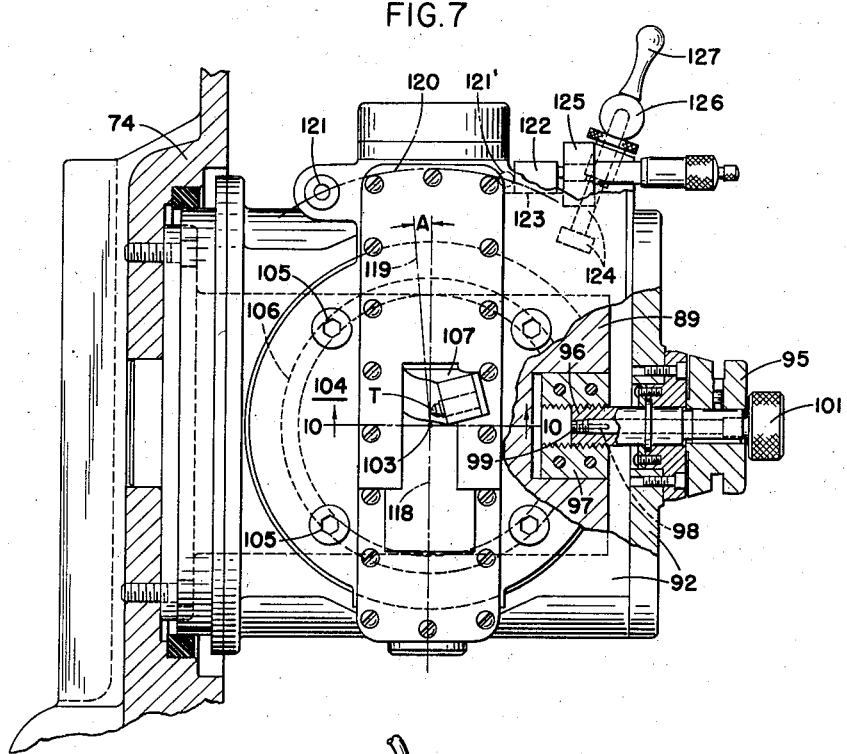
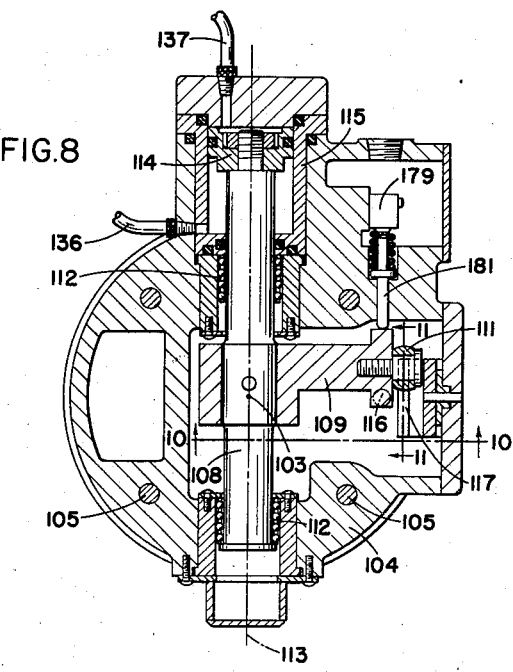

Sept. 30, 1958 — A. FUMIA — 2,853,836
GRINDER FOR TRUING CUTTERS
Filed Dec. 6, 1956 — 8 Sheets-Sheet 5

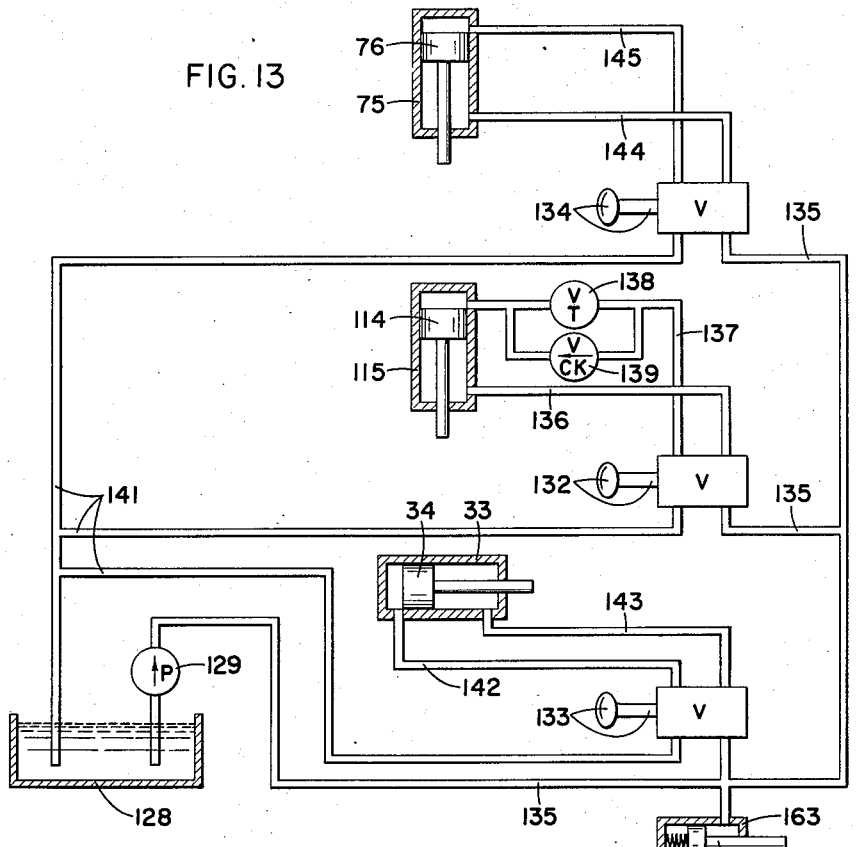
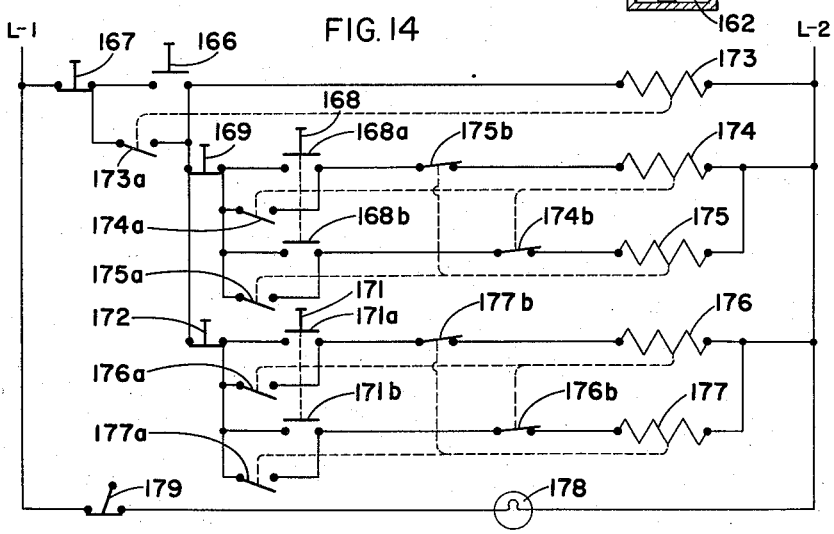

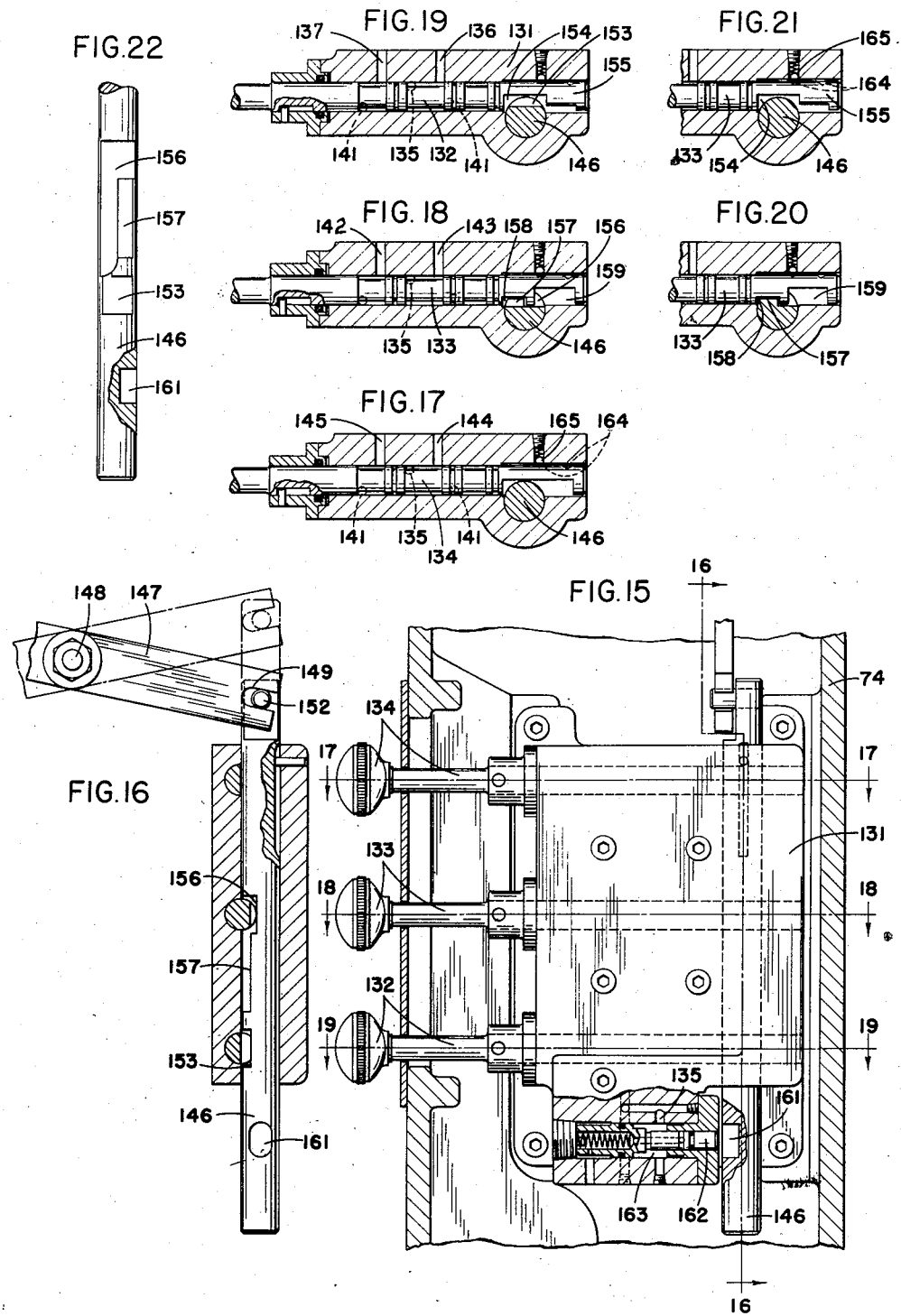

Sept. 30, 1958 — A. FUMIA — 2,853,836
GRINDER FOR TRUING CUTTERS
Filed Dec. 6, 1956 — 8 Sheets-Sheet 8

United States Patent Office 2,853,836
Patented Sept. 30, 1958

2,853,836

GRINDER FOR TRUING CUTTERS

Arthur Fumia, Rochester, N. Y., assignor to The Gleason Works, Rochester, N. Y., a corporation of New York Application December 6, 1956, Serial No. 626,747

18 Claims. (Cl. 51—105)

The present invention relates to grinders for truing gear cutters, especially but not exclusively cutters having angular side cutting profiles.

A grinder according to the invention comprises a frame, a cutter support on the frame, an abrasive wheel and a slide carrying the same, the slide being movable rectilinearly on the frame in the direction of the wheel axis to carry the wheel between a dressing position and a grinding position, a profile dresser for the wheel and a slide supporting the same which is adjustable rectilinearly on the frame in a direction perpendicular to the wheel axis, the dresser being angularly adjustable on the dresser slide about a dresser adjustment axis which is perpendicular to the wheel axis and also perpendicular to the direction of adjustment of the dresser slide, a first stop to limit withdrawal of the wheel slide and to thereby determine the wheel dressing position for the wheel slide which is fixed with respect to the dresser adjustment axis, a second stop to limit advance of the wheel slide to thereby determine its grinding position, said second stop being adjustable in the direction of the wheel axis to enable the profile dresser on the wheel to be brought into coincidence with the side cutting profile of the cutter.

Preferably the dresser comprises a housing and a tool carrier movable on the housing alone and also about a dresser-tool-motion axis which intersects the dresser adjustment axis at right angles, means for moving the tool carrier along said dresser-tool-motion axis, and a cam for moving said carrier about the last-named axis in response to its motion along that axis. The wheel-engaging tip of the tool is aligned with the dresser adjustment axis in one position of the carrier, and the cam is so shaped as to hold the carrier against angular motion as the carrier moves in one direction along the dresser-tool-motion axis until it reaches said one position and as to thereafter impart to the carrier an angular motion about the last-mentioned axis. In this way an angular profile is dressed on the wheel.

The arrangement of machine components is such that by adjusting the dresser body about the dresser adjustment axis the wheel may be suitably dressed for cutters of different pressure angles, and, by adjustment of the said second stop, the angular profile dressed on the wheel may be brought into coincidence with the angular profile of the cutter irrespective of the length of such profile.

The foregoing and other objects and advantages will appear from the following description of the embodiment of the invention shown in the accompanying drawings, wherein:

Fig. 3 is a vertical section in plane 3—3 of Fig. 1;

Figure 1:
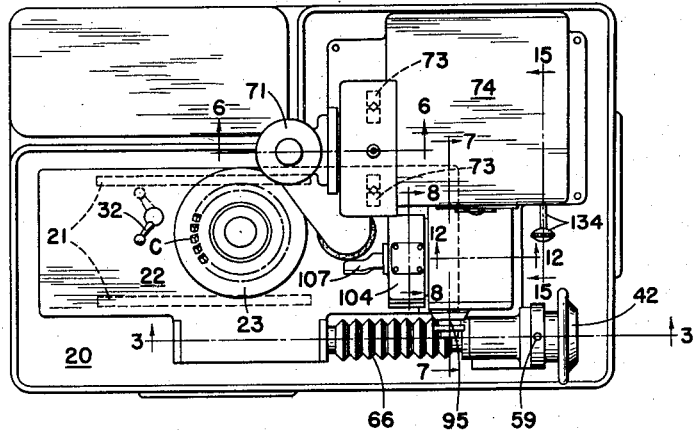
Figs. 1 and 2 are respectively a plan and front elevation of the machine.
Figure 6:
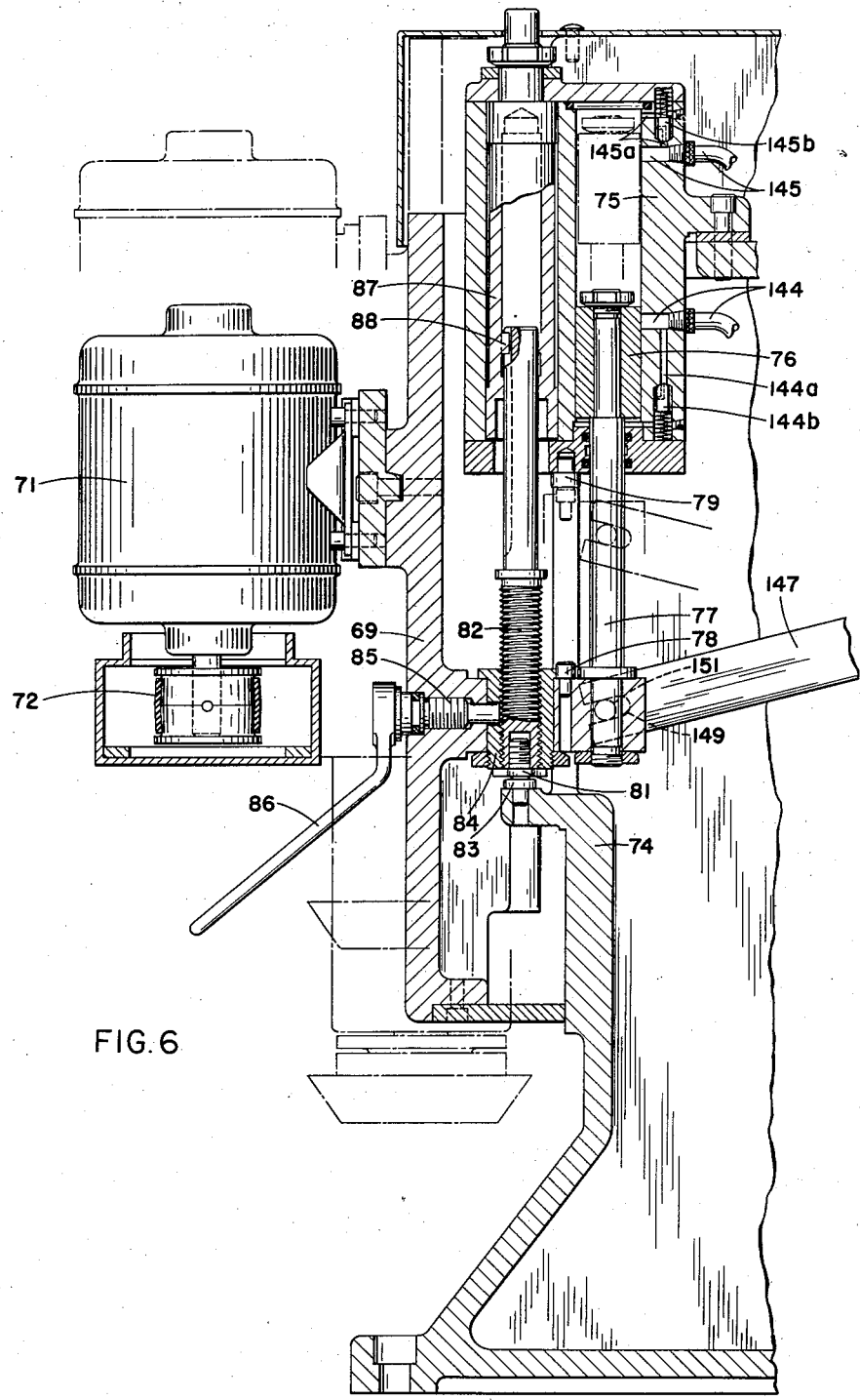
Figure 9:
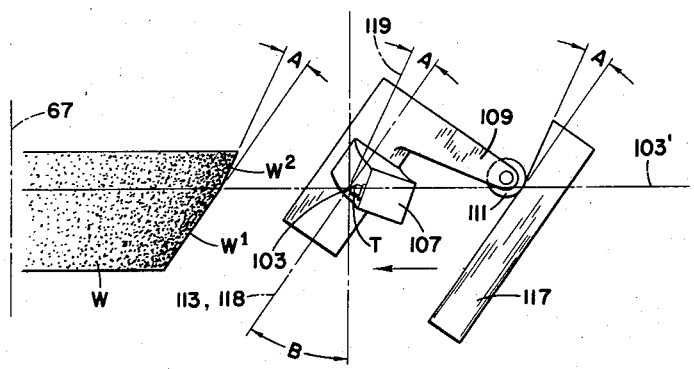
Figure 11:
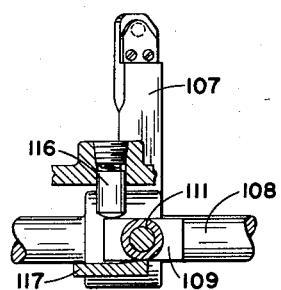
Figure 10:
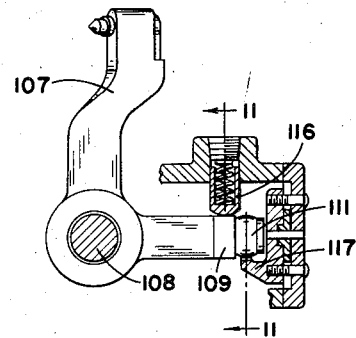
Figure 12:
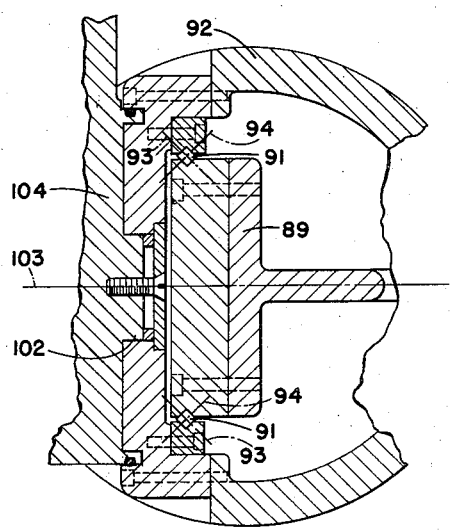
Figures 23, 26:
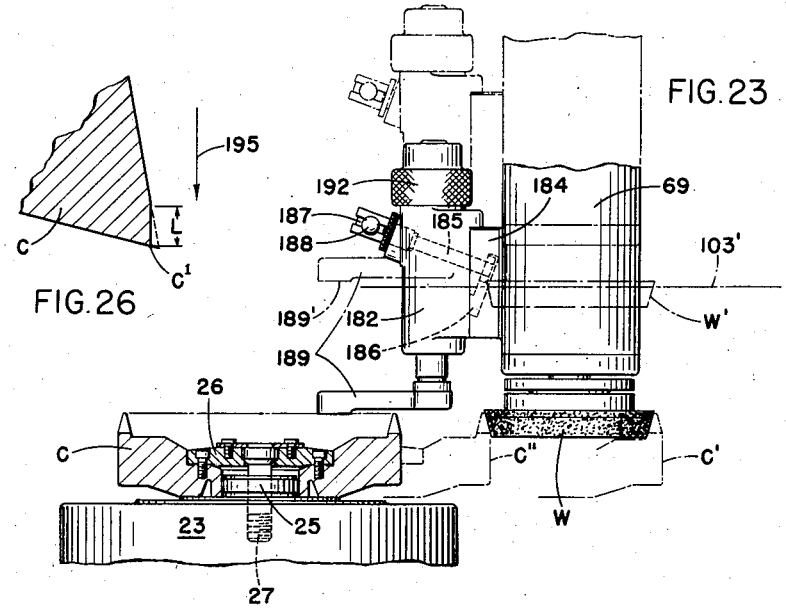
Figure 24:
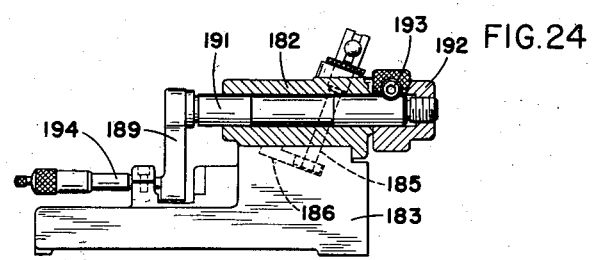
Figure 25:
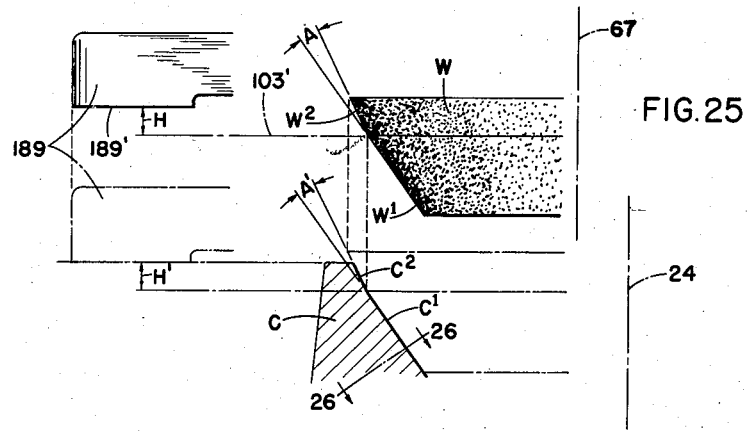

Figs. 4 and 5 are detail sections respectively in planes 4—4 and 5—5 of Fig. 3;

Fig. 6 is a vertical section in plane 6—6 of Fig. 1;

Fig. 7 is a side view of the wheel dresser of the machine, partly in section in plane 7—7 of Fig. 1;

Fig. 8 is a detail section in plane 8—8 of Fig. 1;

Fig. 9 is a schematic view showing the relationship of the dressing device to the wheel being dressed;

Figs. 10 and 11 are views of the dresser tool carrier as seen respectively in plane 10—10 of Fig. 8 and in plane 11—11 of Figs. 8 and 10;

Fig. 12 is a vertical sectional view of the dresser slide, taken in plane 12—12 of Fig. 1;

Figs. 13 and 14 are respectively a hydraulic circuit diagram and an electrical circuit diagram for the machine;

Fig. 15 is a vertical section approximately in plane 15—15 of Fig. 1;

Fig. 16 is a detail vertical section in plane 16—16 of Fig. 15;

Figs. 17, 18 and 19 are horizontal sections respectively in planes 17—17, 18—18 and 19—19 of Fig. 15;

Figs. 20 and 21 are views respectively in the planes of Figs. 18 and 19, but illustrating a different position of operation;

Fig. 22 is a side elevation of an interlock rod which appears in Figs. 15 to 21;

Fig. 23 is a fragmentary front elevational view showing a gage mounted on the wheel slide of the machine;

Fig. 24 is a front view of the same gage mounted on a gage-adjusting fixture;

Fig. 25 is a schematic front elevation to explain the gaging operation; and,

Fig. 26 is a magnified sectional view, in plane 26—26 of Fig. 25, taken through a blade of a cutter trued on the machine.

The machine comprises a frame 20 having horizontal ways 21 along which a cutter slide 22 is movable to carry a cutter C that is to be trued between a loading position remote from grinding wheel W and a grinding position in contact with the wheel. The cutter is supported on a face plate 23 which is rotatable on the slide about vertical axis 24. The face plate has a center 25, Fig. 23, fitting the central bore of the cutter. A clamp plate 26 and screw 27 serve to secure the cutter firmly to the plate 23. Also mounted on the cutter slide is a cutter drive motor 28 which is connected to the face plate by pulleys 29 and endless belt 31. The motor is pivoted to the slide about a vertical axis for tensioning or loosening the belt, and by means of a handle 32 may be shifted pivotally between a position wherein the belt is tensioned sufficiently to drive-connect the motor and the face plate, and another position wherein the belt is loosened to allow the face plate to turn free of the motor.

For rapidly moving the cutter between loading and grinding positions there is provided a fluid motor comprising a cylinder 33, Figs. 3 and 4, integral with the cutter slide, and a piston 34 which is adjustably connected to part 35 of frame 20. This adjustable connection includes a screw 36 integral with piston rod 37 and a tubular nut 38 which is rotatable in part 35 on ball bearings 39. The screw is held against rotation by engagement of a key 41 in a keyway in piston rod 37, while the nut may be rotated either slowly, for fine adjustment of the cutter slide, or rapidly, for coarse adjustment, by means of a handwheel 42 and planetary gearing 43, 44 and 45. Gear 43, Figs. 3 and 5, is an internal gear integral with nut 38 and having one hundred teeth, while gear 44 is an internal gear with ninety-nine teeth and is journaled for rotation coaxially with gear 43 on roller bearings 46. Planet pinion 45 has the same number of teeth in mesh with both gears and is freely rotatable on a pin carried by the shaft 47 of handwheel 42. Shaft 47 is journaled for rotation coaxially of gears 43 and 44 on roller bearings 48. A ring 49 is keyed at 50 to gear 44, and slidable axially on this ring is a two-part clutch member 51 having an internal conical face for frictional engagement with the external conical face 52 of a ring secured to handwheel 42. Member 51 has a plane face for abutment with the right end face of ring 49 and is held against rotation relative to the ring by a key 53. Received in a periperal groove around the two-part member 51 is a ring of ball bearings 54 and a flange 55 of an annular member 56, the latter member being screw-threaded at 57 to a part 58 of the frame. By means of a handle 59 that is secured thereto, the part 56 may be screwed in one direction or the other, to either shift the ball bearings 54 and member 51 to the right in Fig. 3, to thereby clamp the member 51 to the handwheel 42, or to shift the member 51 into abutment with ring 49, to thereby clamp together parts 58, 56, 49 and 51. When member 51 is clamped to the handwheel the gears 44 and 45 can have not relative motion and hence the nut 38 turns as a unit with the handwheel, enabling rapid adjustment of the cutter slide. On the other hand, when member 51 is clamped to the frame part 58, the gear 44 is held stationary with the frame, and turning of the handwheel therefore turns the nut 38 through the reduction gearing 43, 44, 45 at a gear reduction of one hundred to one, enabling the making of fine adjustments of the cutter slide. Calibrations are provided on a dust cap 61 on the handwheel and cooperating markings on the member 56, to facilitate the making of such fine adjustments.

The gear 44 is restrained against substantial axial motion relative to frame part 58 by the ring 49 which is secured to it and by a circle of ball bearings 62. For preventing backlash between screw 36 and nut 38, a second nut, 63, is threaded to the screw; and a spring 64 is provided to constantly urge the two nuts apart, while a key 65 prevents relative rotation of them. The screw and nut assembly 36, 38, 63 is enclosed by a bellows-like flexible seal 66.

Figure 2:
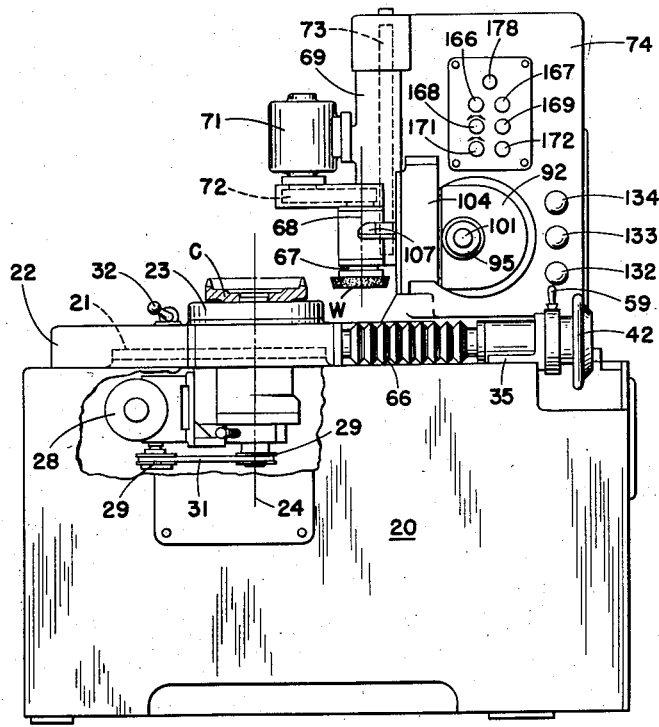

The abrasive wheel W is mounted on a spindle 67 which is rotatable about a vertical axis 68, Fig. 2, in a wheel slide 69. A motor 71 mounted on the slide drives the wheel spindle by means of an endless belt drive 72. The slide is guided by roller ways 73, Figs. 1 and 2, for vertical movement on column 74 of the frame 20, such movement being effected by a fluid motor comprising a cylinder 75, Fig. 6, secured to the column, and a piston 76 connected to the slide by a piston rod 77. The upper limit position of the slide is determined by the abutment of a stop 78 on the slide with a fixed stop 79 on the lower head of cylinder 75. The lower limit position of the slide is adjustable, being determined by the abutment of a stop 81, on a vertical adjusting screw 82, with a fixed stop 83 on the column. The screw 82 is threaded to a nut 84 secured to the slide and is clamped to this nut by a clamp-screw 85 operated by a handle 86. Upon loosening the clamp-screw the adjusting screw may be turned, to raise or lower the stop 81 relative to the slide. This may be accomplished by means of a wrench applied to the upper end of a rod 87 which is rotatable in the cylinder block 75 and is keyed at 88 to the adjusting screw.

Extending laterally from the column 74 and integral therewith is a roller way 89, Fig. 12, having opposed V-grooves each for guiding a series of roller bearings 91 for supporting a dresser slide 92 for motion in a horizontal direction, alternate rollers of each series having their axes 93 and 94 inclined to each other by ninety-degrees. Preferably a similar roller and V-groove arrangement is employed for supporting the cutter slide on ways 21 and for supporting the wheel slide on ways 73. For adjusting the dresser slide along way 89, to move the dresser on the slide toward or away from the wheel axis 68, a knob 95, Figs. 1, 2 and 7, is provided. This knob is secured to a screw 96, Fig. 7, which is rotatable on the slide and is threaded to a nut 97 secured to way 89. The threaded end of the screw is slotted, at 98, so that it may be expanded by a tapered locking screw 99 which is threaded into it. By turning the lock screw in one direction or the other by means of its knurled head 101, the slotted end of screw 96 may be expanded to clamp in nut 97 or loosened to enable adjustment of the slide.

Supported on the dresser slide by bearing 102, Fig. 12, for adjustment about horizontal axis 103 (which is parallel to cutter slide ways 21), is dresser housing 104. This housing may be clamped in adjusted position by screws 105 which extend through arcuate slot 106, Fig. 7, in the slide. The wheel dressing tool T, which preferably is diamond tipped, is mounted on arm 107 of an L-shaped tool carrier, Figs. 7, 8, 10 and 11 which is secured to a piston rod 108. The other arm of the tool carrier, 109, supports a cam follower roller 111. The piston rod 108 is supported on ball sleeve bearings 112 for motions relative to the housing 104 about the axis 113 of the rod and also along that axis. A piston 114 on the rod operates in cylinder 115 in the housing. As shown, the axis 113 intersects the dresser adjustment axis 103 at right angles. A spring-backed plunger 116 acts on arm 109 to hold roller 111 against a cam 117 secured to the housing 104. This cam is so shaped that it holds the tool carrier against rotation about axis 113 as the piston moves upwardly in Fig. 8 to cause the wheel-engaging tip of tool T to move in a straight line 118 in Figs. 7 and 9 until it reaches axis 103 and that at this point it swings the upwardly-moving carrier about axis 113 (counter-clockwise in Fig. 9) to cause the tip of the tool to move along diverging line 119 which extends at angle A to line 118. As the tool T traverses line 118 to the point of intersection with axis 103 it dresses the conical side surface $W^1$ of wheel W, Figs. 9 and 25, which subsequently grinds a narrow land L, Fig. 26, back of the side cutting edges C' of the blades of cutter C; and as the tool T traverses the line 119 it dresses the conical surface $W^2$ of the wheel which may or may not grind a land back of the outer ends $C^2$ of the side-cutting edges of the cutter blades. As shown in Fig. 25 the cutter blade edges $C^1$ and $C^2$ are inclined to each other at an angle A', and if this angle is equal to angle A, lands similar to L may be ground back of edges $C^2$. On the other hand, if A is appreciably larger than A', such a land may not be produced. The angle A' is shown exaggerated, and in practice is on the order of only about two degrees.

In order to dress wheel surface $W^1$ to exactly the same inclination to wheel axis 67 that the cutter edge C' is inclined to cutter axis 24, the latter inclination being the "pressure angle" of the cutter, the dresser housing 104 is adjusted about axis 103 to set the dresser-tool-motion axis 113 (which in Fig. 9 coincides with line 118) at a corresponding angle B with respect to the vertical, this adjustment being made by means of gage blocks and a micrometer after the screws 105 are first loosened. For purpose of such adjustment the housing 104 is provided with a fixed pin 121, Fig. 7, adapted to abut a gage block 122 seated on a V-grooved surface 123 on slide 92; and the slide is provided with surfaces for seating a detachable micrometer 125 and with a T-slot for receiving the head of a clamp 124 for holding the micrometer in place. The clamp has an eccentric 126 which, when turned by means of handle 127, presses the micrometer to the slide. To make the adjustment, the particular length of gage block and the particular micrometer setting that will produce the desired pressure angle are first determined by calculation; and after this micrometer setting has been made and the proper gage block has been put in place against the micrometer, the housing is rotated about axis 103 along the path 120 until pin 121 is brought into abutment with the gage block, i. e. to dotted line position 121'. The screws 105 are then tightened and the micrometer and the gage block removed.

The hydraulic system of the machine includes a sump 128, Fig. 13, and a motor operated pump 129 located in the frame 20. In the column 74 is valve body 131 in which three manually operable reversing valves 132, 133 and 134 are slidable, the valve 132 controlling the dresser motor 114, 115, the valve 133 the cutter slide motor 33, 34, and the valve 134 the wheel slide motor 75, 76. When the valve 132 is moved in, i. e. to its limit position to the right in Figs. 13, 19 and 21, fluid under pressure from pump 129 is applied through passage 135, valve 132, passage and line 136 to the lower chamber of cylinder 115, moving the dresser piston 114 upwardly. During this stroke, which is the dressing stroke of the dresser tool T, fluid exhausts from the upper chamber of cylinder 115 through the line and passage designated 137, the line having parallel branches in which a throttle valve 138 and a spring-backed check valve 139 are respectively provided; and then through exhaust passage 141 into sump 128. When the valve 132 is moved out, the pressure and exhaust connections to the cylinder 115 are reversed, and as a result the piston 114 is moved downwardly to cause the reset stroke of tool T. During the dressing stroke the check valve 139 closes so that throttle valve 138 becomes effective to restrict the exhaust through passage 137, causing the dressing stroke to be relatively slower than the reset stroke.

When valve 133 is moved to the left from its position shown in Figs. 18 and 20, the pressure line 135 is connected to a passage and line 142 leading to the outer end of cylinder 33, causing the cylinder 33 to be moved to the left in Figs. 3, 4 and 13, to move the cutter slide from working position to loading position. Fluid from the inner end of cylinder 33 is exhausted through lines 143 and 141 to the sump. When valve 133 is moved in, to the position shown in Figs. 18 and 20, the pressure and exhaust connections to lines 142 and 143 are reversed and the slide is moved to the right to working position. To snub the terminal part of the slide motion to working position, the passage 142, Fig. 4, is closed by the piston 34 as the cylinder approaches its right limit position. The stroke of the cylinder is completed at a slow rate by exhaust of fluid through a by-passage 142a, controlled by a spring-backed check valve 142b which has a bleed opening therethrough. At the beginning of the opposite stroke, of the cylinder 33, to the left, i. e. when pressure is applied through passage 142, the valve 142b opens and hence does not retard the stroke. Similarly the closure of passage 143 by the piston, and the provision of a by-passage 143a, controlled by a spring-backed check valve 143b having a bleed opening therethrough, results in the terminal part of motion of cylinder 33 to the left being at a slow rate.

Valve 134, when moved in to its right limit position shown in Fig. 17, connects pressure line 135 to passage 144 leading to the lower chamber of cylinder 75, and connects passage 145 which leads from the upper chamber of the cylinder to the exhaust passage 141, thereby causing the piston 76 to raise the wheel slide to its dressing position. When moved outwardly to its left limit position the valve connects passage 145 to pump pressure and passage 144 to exhaust, causing the piston to lower the slide to its working position. As shown in Fig. 6 passage 144 is closed by piston 76 before the latter reaches its lowermost position, but by-pass 144a containing spring-backed bleed-type check valve 144b enables fluid passage from the cylinder at a reduced rate. In the presence of fluid flow in the reverse direction, the check valve opens to allow relatively unrestricted flow from passage 144 into the cylinder. A similar by-pass 145a and bleed-type check valve 145b are provided to control the terminal part of the up stroke of the piston.

A mechanical interlock is provided to prevent the dresser from operating except when the wheel slide has been raised to its uppermost position, to prevent the wheel slide from being lowered while the dresser is in reset position, and to prevent return of the cutter slide to loading position when the wheel slide is down. This interlock comprises a rod 146, Figs. 15–22, slidable vertically in the valve housing 131 and connected to the wheel slide by a lever 147. The lever is fulcrumed to the column 74 at 148, Fig. 16, and has at its opposite ends slots 149 respectively engaging a pin 151, Fig. 6, on the slide 69 and a pin 152, Fig. 16, on the rod, the arrangement being such that as the slide moves upwardly the rod is moved downwardly, and vice versa.

Rod 146 has a notch 153 which cooperates with a notch 154 and a part 155 of dresser valve 132 in a way which will be understood from Figs. 16, 19 and 21. When the valve is in, i. e. in dress position, the notch 154 is abreast the rod 146 and hence the rod is free to move. Consequently the wheel slide may be moved downwardly (resulting in upward motion of rod 146) by fluid pressure upon movement of valve 134 to its out position. However, when the dresser valve is out, in reset position, part 155 engages in notch 153 and thereby prevents movement of the wheel slide 69 to down position even though the operator may inadvertently shift the valve 134 out. Conversely, when the wheel slide is down, an un-notched part of rod 146 lies in notch 154, as shown in Fig. 21, and thereby prevents the valve 132 from being moved out to reset position. These protective features assure the tool T being above the wheel W and hence out of the path of the wheel before the latter is moved from dressing position.

Rod 146 also has a notch 156 and a part 157 which cooperate with notches 158 and 159 in cutter slide valve 133, Figs. 18 and 20. When the rod 146 is down, the notch 156 overlies the valve so that the latter may be moved either in or out to cause advance or retraction of the slide. However when the rod is raised, the part 157 thereof lies either in notch 158 or in notch 159 and thereby prevents movement of the valve. Fig. 20 shows the condition wherein part 157 lies in notch 158 and thereby prevents out motion of the valve which would cause the cutter slide to be retracted to its loading position. This prevents the damage which would occur if the inside cutter shown at C' in Fig. 23 were retracted (moved to the left) before raising of the wheel W.

The rod 146 also has a recess 161 which when the rod is lowered is aligned with a spring-backed plunger 162 slidable in a cylinder 163 in the valve housing 131, this cylinder being connected to the pressure line 135. So long as pressure is applied to cylinder 163 by pump 129 the plunger is held retracted, but should pressure fail the spring advances the plunger into recess 161 and thereby holds the wheel slide in its upper or dressing position. This prevents the wheel slide from dropping accidentally as a result of the pump motor being stopped or the pump pressure failing for any other reason while the slide is raised.

As shown in Figs. 17 to 21, each valve 132, 133, 134 is provided with spaced recesses 164 which are respectively engaged by a spring-backed ball detent 165 in the in or out positions of the valve.

The machine is provided with push button type start and stop switches 166 and 167, Figs. 2 and 14, for the pump motor, switches 168 and 169 for wheel motor 71, and switches 171 and 172 for the cutter motor 28. Switches 168 and 171 are of a type in which the switch button is rotatable to one or the other of two positions and in which either a contact 168a (or 171a) or a contact 168b (or 171b) is closed when the button is pressed, depending upon the rotational position of the button. Other electrical equipment includes a controller 173 which when energized causes operation of the pump motor, controllers 174 and 175 which when energized respectively cause forward and reverse operation of wheel motor 71, and controller 176 and 177 which are energized to cause forward and reverse operation, respectively, of the cutter motor 28. The controllers have movable contacts which close when the controller windings are energized, these contacts being designated respectively 173a to 177a. Controllers 174 to 177 also have movable contacts, respectively 174b to 177b, which open when the controller windings are energized, to prevent energization of a forward controller when the reverse controller for the same motor is energized, and vice versa. A red signal lamp 178 to indicate when dressing is in progress is provided on the switch panel of the machine, and a normally closed limit switch 179 for the lamp is so arranged in the dresser housing 104, Fig. 8, that the switch is opened by arm 109 acting through a spring-backed plunger 181 only when the dresser piston and tool arm assembly is in its uppermost limit position.

For use in adjusting the lower limit position of the wheel slide (by adjusting screw 82, Fig. 6), the detachable gage and adjusting fixture shown in Figs. 23–25 are provided. The gage comprises a body 182 adapted to fit onto either the frame 183 of the adjusting fixture or a pad 184 formed on the wheel slide 69. A clamp for the gage body is provided which is similar to clamp 124, 126, 127 in Fig. 7. It comprises a stem 185 having a head adapted to seat in a T-slot 186 in either frame 183 or pad 184 and an eccentric 187 rotatable on the stem by means of a handle 188 for clamping the gage body against the frame or the pad, as the case may be. A gage arm 189 has an integral stem 191 which is rotatable and also slidable axially in the gage body, and has adjustably screw threaded thereon a knurled nut 192 which may be locked in adjusted position by means of a set screw 193. The gage body 183 supports a micrometer 194 by means of which the gage may be adjusted to the desired length by turning nut 192.

To use the machine, the dresser body 104 is first adjusted about axis 103 to an angle, B in Fig. 9, corresponding to the blade pressure angle of the particular cutter to be trued. The gage 182, 189 is then clamped to the fixture frame 183 and by using the micrometer 194 is adjusted to such length that when it is subsequently clamped to the pad 184 the surface 189' of arm 189 will be spaced at a distance H, from the horizontal plane 103' which contains the dresser pivot adjustment axis 103, that is equal to the distance H' between the blade tip plane and the juncture of edges $C^1$ and $C^2$ of the cutter. To this end the micrometer is preferably so calibrated that when adjusted to zero it will provide a gage length that will cause the gaging surface 189' of arm 189 to lie exactly in plane 103'.

After the gage has been adjusted to reflect the dimension H', it is secured to the pad 184 and the cutter C to be trued is mounted on face plate 23. Valves 132 and 134 are pushed in and valve 133 is pulled out, so that the wheel slide and dresser will be in up position when pump 129 is started; and the switch 166 is momentarily closed to complete a circuit through controller 173 between leads L–1 and L–2 of the suitable electrical energy source for the machine, thereby starting the pump motor. Contact 173a immediately closes, establishing a holding shunt around switch 166. Valve 133 is pushed in to cause advance of the cutter slide; the handle 59 is turned to coarse adjustment position; and wheel 42 is turned to position the cutter beneath gage arm 189 but clear of the path of wheel W. The screw 82 is then turned to adjust the stop 81 to its lowermost position relative to piston 76 and the wheel slide 69; and then valve 134 is pulled out, causing the wheel slide to move downwardly to the limit of its stroke determined by the abutment of stops 81 and 83. The screw 82 is now turned to lower the wheel slide until the gage arm 189 touches the tip of a cutter blade. To facilitate the gaging operation the handle 32 is turned to free the cutter plate 23 from motor 28, so that the cutter can be turned by hand beneath the gage. After the gaging is completed the handle 86 is turned to clamp adjusting screw 82; the handle 32 is turned to connect the cutter plate 23 to the motor 28; valve 134 is pushed in to cause the wheel slide to move upwardly to dressing position; and the gage 182 is removed from pad 184.

The wheel motor 71 is now started by momentarily closing start switch 168, thereby energizing controller 174 or 175 depending upon which direction the wheel W is to rotate so as to move in direction 195, Fig. 26, with respect to edge $C^1$ of the particular cutter being trued, this depending upon whether the cutter is of right hand or left hand. Contact 174a or 175a immediately closes to hold the controller energized even though switch 168 subsequently opens. Valve 132 is then pulled out, to move the dresser tool T to reset position. In this position switch 179 is closed, causing lamp 178 to light. The dresser slide is now moved in, by turning knob 95, far enough so that stock will be removed from the wheel during the ensuing dressing operation; and the valve 132 is pushed in to effect the upward or wheel-dressing stroke of the tool. At the conclusion of this stroke the lamp 178 goes off.

After dressing is completed the valve 134 is pulled out, lowering the wheel to its working position, and the switch 171 is momentarily closed to start the cutter motor 28. Either forward controller 176 or reverse controller 177 is energized, to produce rotation of the cutter in the direction, opposite to arrow 195, in which the cutter will rotate when in use. Contact 176a or 177a will immediately close to provide a shunt around switch 171. The cutter is now fed into the rotating wheel by slowly turning wheel 42, first with the handle 59 set to coarse adjustment position until the cutter is close to the wheel, and then with the handle set to fine adjustment position. This fine feed is continued only until a narrow land L, Fig. 26, on the order of about two or three thousandths of an inch in width is ground back of the edges $C^1$ of the cutter blades.

The cutter slide is then moved back to loading position by pulling out valve 133 and the wheel slide raised by pushing in valve 134; and the motors are stopped by momentarily opening switches 167, 169 and 172 which deenergizes the controllers and causes their holding contacts 173a, 174a or 175a, and 176a or 177a to open.

Cutters with either outside or inside finishing blades, or both, may be trued on the machine. For example in Fig. 23 the cutter indicated in broken lines at C' is positioned to have its inside cutting edges trued by wheel W, while there is shown at C'' a cutter positioned to have its outside cutting edges trued by the wheel.

Having now described the preferred embodiment of the invention and the operation thereof, what is claimed is:

1. A grinder for truing gear cutters, especially but not exclusively cutters having angular side cutting profiles, comprising a frame, a cutter support on the frame, an abrasive wheel and a slide carrying the same, the slide being movable rectilinearly on the frame in the direction of the wheel axis to carry the wheel between a dressing position and a grinding position, a profile dresser for the wheel and a slide supporting the same which is adjustable rectilinearly on the frame in a direction perpendicular to the wheel axis, the dresser being angularly adjustable on the dresser slide about a dresser adjustment axis which is perpendicular to the wheel axis and also perpendicular to the direction of adjustment of the dresser slide, a first stop to limit withdrawal of the wheel slide and to thereby determine the wheel dressing position for the wheel slide which is fixed with respect to the dresser adjustment axis, a second stop to limit advance of the wheel slide to thereby determine its grinding position, said second stop being adjustable in the direction of the wheel axis to enable the profile dressed on the wheel to be brought into coincidence with the side cutting profile of the cutter.

2. A grinder according to claim 1 having a gage effective between the wheel slide and the tip plane of a cutter on said support, for use in adjusting said second stop.

3. A grinder according to claim 1 in which the cutter support comprises a slide movable on the frame in a direction perpendicular to the wheel axis for effecting feed and withdrawal motions of the cutter with respect to the wheel.

4. A grinder according to claim 3 in which there is a motor acting between the frame and the cutter slide for moving the latter on the frame between a working position and a loading position, and means including a screw-threaded element for moving the motor relative to the frame in said direction perpendicular to the wheel axis.

5. A grinder according to claim 4 in which there is a manually operable member for rotating said screw-threaded element, planetary reduction gearing effective between said member and said element and the frame, and means for coupling one element of said gearing either to the frame or to said member for obtaining a fine feed or a coarse feed, respectively.

6. A grinder according to claim 3 in which there is a first motor for operating the cutter slide, a second motor for operating the dresser, and means responsive to the position of the wheel slide for preventing said motors from being operated when the wheel slide is in grinding position.

7. A grinder according to claim 6 in which there is a control for said dresser motor movable between dressing-stroke and reset-stroke positions, and means for holding the wheel slide in dressing position when said control is in said reset-stroke position.

8. A grinder according to claim 6 in which said motors comprise fluid operated cylinder-piston units and there are manually operable reversing valves for controlling said units, and said means responsive to the position of the wheel slide comprises a mechanical interlock between the slide and said valves.

9. A grinder according to claim 8 in which the reversing valve for the dresser motor is so arranged that when positioned to cause the dresser reset stroke it provides a mechanical interlock for holding the wheel slide against motion.

10. A grinder according to claim 1 in which the dresser comprises a housing and a tool carrier movable in the housing along and also about a dresser-tool-motion axis which intersects the dresser adjustment axis at right angles, means for moving the tool carrier in the housing along said dresser-tool-motion axis, and a cam for moving said carrier about the last-named axis in response to its motion along that axis.

11. A grinder according to claim 10 in which there is a tool on said carrier whose wheel-engaging tip is aligned with the dresser adjustment axis in one position of the carrier, and in which said cam is so shaped as to hold the carrier against angular motion as the carrier moves in one direction along the dresser-tool-motion axis until it reaches said one position and as to thereafter impart to the carrier an angular motion about the last-mentioned axis.

12. A grinder comprising a frame, an abrasive wheel and a support therefor on the frame, a dresser slide movable on the frame in a direction perpendicular to the wheel axis, a dresser housing adjustable on said slide about an axis perpendicular to the wheel axis, a tool carrier movable in the housing along and also about a dresser-tool-motion axis which intersects the dresser adjustment axis at right angles, a motor for reciprocating the tool carrier in the housing along said dresser-tool-motion axis, and a cam for controlling the position of carrier about the dresser-tool-motion axis as it moves along that axis.

13. A grinder according to claim 12 in which there is a tool on said carrier whose wheel-engaging tip is aligned with the dresser adjustment axis in one position of the carrier, and in which said cam is shaped to hold the carrier against angular motion as the carrier moves in one direction along the dresser-tool-motion axis until it reaches said one position and to thereafter impart to the carrier an angular motion about the last-named axis.

14. A grinder for truing gear cutters, comprising a frame, a cutter slide movable rectilinearly on the frame to carry a cutter thereon between a loading position and a grinding position, an abrasive wheel and a wheel slide carrying the same, the wheel slide being movable rectilinearly on the frame in the direction of the wheel axis, and perpendicular to the direction of motion of the cutter slide, to carry the wheel between a dressing position and a grinding position, a profile dresser for the wheel and a dresser slide supporting the same, the dresser slide being adjustable on the frame in a direction perpendicular to the wheel axis, and the dresser being angularly adjustable on the dresser slide about a dresser adjustment axis which is perpendicular to the wheel axis and also perpendicular to the direction of adjustment of the dresser slide.

15. A grinder according to claim 14 in which the dresser comprises a housing, a tool carrier movable rectilinearly in the housing, and a wheel dressing tool so disposed on the carrier that the path of the wheel-engaging tip thereof intersects said dresser adjustment axis.

16. A grinder according to claim 15 in which the tool carrier is movable in the housing angularly about an axis which intersects said dresser adjustment axis and extends in the direction of rectilinear motion of the tool carrier, and there is a cam for controlling such angular motion of the carrier during such rectilinear motion.

17. A grinder according to claim 16 in which the cam is so shaped as to hold the carrier against angular motion as it moves rectilinearly in one direction until the wheel-engaging tip of the tool reaches the dresser adjustment axis and as to thereafter impart an angular motion to the carrier.

18. A grinder or other machine tool having a frame, a slide on the frame, a cylinder on the slide, a piston on which the cylinder is reciprocable to shift the slide on the frame by fluid pressure, an element screw-threaded to the piston, a manually operable member for rotating the screw-threaded element to feed the slide along the frame, planetary reduction gearing effective between the screw-threaded element and said member and the frame, said gearing comprising a first gear co-rotatable with said element, a second gear coaxial with the first, and a planet gear carried by said member, and a coupling means comprising a part screw-threaded to the frame and a clutch element movable by said part for coupling said second gear either to the frame or to said member for respectively obtaining a fine feed or a coarse feed.

References Cited in the file of this patent

UNITED STATES PATENTS

| | | |
|---|---|---|
| 2,366,139 | Wildhaber | Dec. 26, 1944 |
| 2,533,056 | Selby | Dec. 5, 1950 |
| 2,561,936 | McFerron | July 24, 1951 |